United States Patent
Wangerow

(12) 
(10) Patent No.: US 6,730,426 B2
(45) Date of Patent: May 4, 2004

(54) INTEGRAL SEALING METHOD FOR FUEL CELL SEPARATOR PLATES

(75) Inventor: James R. Wangerow, Lemont, IL (US)

(73) Assignee: Mosaic Energy, LLC, Des Plaines, IL (US)

(*) Notice: Subject to any disclaimer, the term of this patent is extended or adjusted under 35 U.S.C. 154(b) by 246 days.

(21) Appl. No.: 09/760,087

(22) Filed: Jan. 12, 2001

(65) Prior Publication Data

US 2002/0094464 A1 Jul. 18, 2002

(51) Int. Cl.[7] ............... H01M 8/02; H01M 8/04
(52) U.S. Cl. ................................. 429/35; 429/36
(58) Field of Search ....................... 429/34–36

(56) References Cited

U.S. PATENT DOCUMENTS

| | | | |
|---|---|---|---|
| 4,001,042 A | | 1/1977 | Trocciola et al. |
| 4,588,661 A | | 5/1986 | Kaufman et al. |
| 4,826,741 A | * | 5/1989 | Aldhart ............... 429/19 |
| 4,929,517 A | | 5/1990 | Luoma et al. |
| 5,096,786 A | | 3/1992 | Granata, Jr. et al. |
| 5,176,966 A | * | 1/1993 | Epp ............... 429/26 |
| 5,187,025 A | | 2/1993 | Kelland et al. |
| 5,270,132 A | | 12/1993 | Breault et al. |
| 5,342,706 A | * | 8/1994 | Marianowski ............... 429/35 |
| 5,464,453 A | | 11/1995 | Tong et al. |
| 5,523,175 A | | 6/1996 | Beal et al. |
| 5,534,362 A | | 7/1996 | Okamoto et al. |
| 5,837,395 A | | 11/1998 | Breault et al. |
| 5,912,088 A | * | 6/1999 | Ernst ............... 429/35 |
| 5,942,347 A | * | 8/1999 | Koncar ............... 429/30 |
| 5,980,977 A | | 11/1999 | Deng et al. |
| 6,020,083 A | * | 2/2000 | Breault ............... 429/36 |
| 6,030,718 A | | 2/2000 | Fuglevand et al. |
| 6,040,072 A | | 3/2000 | Murphy et al. |
| 6,057,054 A | * | 5/2000 | Barton ............... 429/42 |
| 6,066,409 A | | 5/2000 | Ronne et al. |
| 6,153,326 A | * | 11/2000 | Matsukawa et al. ............... 429/34 |
| 6,444,344 B1 | * | 9/2002 | Saito ............... 429/34 |
| 2002/0094464 A1 | * | 7/2002 | Wangerow ............... 429/32 |

FOREIGN PATENT DOCUMENTS

| | | | | |
|---|---|---|---|---|
| EP | 918362 | * | 5/1999 | ............... H01M/8/02 |
| EP | 933826 | * | 8/1999 | ............... H01M/8/02 |
| JP | 407065847 | * | 3/1995 | ............... H01M/8/02 |
| JP | 20000077084 | * | 3/2000 | ............... H01M/8/02 |

\* cited by examiner

*Primary Examiner*—Mark Ruthkosky
(74) *Attorney, Agent, or Firm*—Mark E. Fejer

(57) ABSTRACT

A bi-polar separator plate constructed of a graphite/carbon composition and having a substantially flat peripheral sealing region on each face in which substantially flat peripheral sealing region a silicone gasket is disposed. The silicone gasket is applied to the bi-polar separator plate by a screen-printing process.

14 Claims, 1 Drawing Sheet

INTEGRAL SEALING METHOD FOR FUEL CELL SEPARATOR PLATES

BACKGROUND OF THE INVENTION

1. Field of the Invention

This invention relates to a method for gasketing a fuel cell stack in which the gasket materials are applied to the bi-polar separator plates of the fuel cell stacks using a screen printing process. More particularly, this invention relates to a method for gasketing polymer electrolyte membrane (PEM) fuel cell stacks in which the gasket materials are applied to the bipolar separator plates thereof, which plates are made from graphite/carbon compositions. The material used to produce the gaskets is silicone. The method enables application of a fixed thickness of silicone of a desired Durometer to the separator plate for sealing whereby, in addition to fluid sealing, a compressive force is achieved in the active zone so as to maintain proper electrical conduction within the fuel cell stack.

2. Description of Prior Art

Generally speaking, fuel cell electrical output units are comprised of a stacked multiplicity of individual cells separated by bi-polar electronically conductive separator plates. Individual cells are sandwiched together and secured into a single staged unit to achieve desired fuel cell energy output. Each individual fuel cell generally includes an anode and cathode electrode, a common electrolyte, and a fuel and oxidant gas source. Both fuel and oxidant gases are introduced through manifolds, either internal or external to the fuel cell stack, to the respective reactant chambers between the separator plate and the electrolyte.

There are a number of fuel cell systems currently in existence and/or under development which are designed for use in a variety of applications including power generation, automobiles, and other applications where environmental pollution is to be avoided. These include molten carbonate fuel cells, solid oxide fuel cells, phosphoric acid fuel cells, and polymer electrolyte membrane fuel cells (also referred to as proton exchange membrane fuel cells).

Commercially viable fuel cell stacks may contain up to about 600 individual fuel cell units, each having a planar area up to twelve square feet. In stacking such individual cells, separator plates separate the individual cells, with fuel and oxidant each being introduced between a set of separator plates, the fuel being introduced between one face of the separator plate and the anode side of an electrolyte and oxidant being introduced between the other face of the separator plate and the cathode side of a second electrolyte. Cell stacks containing 600 cells can be up to twenty feet tall, presenting serious problems with respect to maintaining cell integrity during heat-up and operation of the fuel cell stack. Due to thermal gradients between cell assembly and cell operating conditions, different thermal expansions, and the necessary strength of materials required for the various components, close tolerances and very difficult engineering problems are presented. In this regard, cell temperature control is highly significant and, if it is not accomplished with a minimum temperature gradient, uniform current density will not be maintainable, and degradation of the cell will occur.

In a polymer electrolyte membrane fuel cell, the electrolyte is an organic polymer in the form of a proton conducting membrane, such as a perfluorosulfonic acid polymer. The separator plates of a polymer exchange membrane fuel cell stack are used to channel air to the cathode sides, hydrogen-rich gas to the anode sides, and a cooling medium between the anode and cathode. Gaskets are required to prevent these gases and liquids from directly contacting each other within the stack or from leaking out across perimeter seals. Providing an effective seal is particularly problematic due to the nature of the graphite/carbon bi-polar separator plates utilized in polymer electrolyte membrane fuel cell stacks. More particularly, it is known that many materials do not bond or otherwise adhere well to graphite/carbon components, particularly under fuel cell operating conditions.

One solution is to apply the sealing material to other components of the fuel cell stack. U.S. Pat. No. 6,057,054 to Barton et al. teaches a membrane electrode assembly for electrochemical fuel cell comprising coextensive ion exchange membrane and electrode layers and a resilient fluid impermeable integral seal made by impregnating a sealing material into the porous electrode layers in the sealing regions. The uncured sealant material is a flow processable elastomer that is applied to the membrane electrode assembly using a vacuum injection molding process. The elastomer material is selected from the group consisting of silicones, fluorosilicones, fluoroelastomers, ethylene propylene di-methyl, and natural rubber.

U.S. Pat. No. 4,588,661 to Kaufman et al. teaches a bi-polar gas reactant distribution assembly for use in a fuel cell having a solid edge seal comprising a solid, fusible, gas impervious edge sealing compound produced from thermoplastic resins or polyethersulfone.

U.S. Pat. No. 5,096,786 to Granata, Jr. et al. teaches a phosphoric acid fuel cell having integral edge seals formed by an elastomer permeating an outer peripheral band contiguous with the outer peripheral edges of the cathode and anode assemblies and the matrix. The elastomer is a copolymer of tetrafluoroethylene and propylene.

Screen-printing as a means for applying a flowable material onto a substrate is used extensively in the ink printing business. This same technology has been extended to several industries such as manufacturers of automotive gaskets. Such gaskets have proven to be a very cost-effective method to produce large quantities of gaskets with silicone or similar heat curable sealing materials with thicknesses of less than 10 mils. U.S. Pat. No. 4,001,042 to Trocciola et al. teaches a method for producing a fuel cell electrode/matrix element in which a hydrophilic electrolyte matrix layer is screen-printed onto the surface of a fuel cell gas diffusion electrode, which electrode includes a catalyst layer on the surface onto which the matrix layer is printed. The step of printing includes forming an ink by mixing an aqueous solution of polyethylene oxide with a matrix material and printing to the surface of the electrode through a screen. Thereafter, the matrix layer is heat treated to remove most of the aqueous solution of polyethylene oxide.

SUMMARY OF THE INVENTION

It is one object of this invention to provide a method for sealing fuel cell separator plates comprising graphite/carbon compositions employed in fuel cell stacks.

It is another object of this invention to provide a graphite/carbon bi-polar separator plate suitable for use in polymer electrolyte membrane fuel cells and comprising integral seal means.

It is yet another object of this invention to provide a polymer electrolyte membrane fuel cell stack comprising graphite/carbon bi-polar separator plates having integral seals.

These and other objects of this invention are addressed by a fuel cell stack comprising a plurality of polymer electrolyte membrane fuel cell units having an anode electrode, a cathode electrode and a polymer electrolyte membrane disposed between the anode electrode and the cathode electrode. A graphite/carbon bi-polar separator plate having a centrally disposed active region substantially coextensive with the electrodes separates each of the fuel cell units between the anode electrode and the cathode electrode of adjacent fuel cell units. The graphite/carbon bi-polar separator plates comprise distribution means for providing an oxidant to the cathode electrode, a fuel gas to the anode electrode and a cooling medium between the anode electrodes and the cathode electrodes. Typically, the separator plates form internal conduits through which the cooling medium is flowing. The graphite/carbon bi-polar separator plates of this invention are provided with substantially flat peripheral sealing regions on each face extending around the centrally disposed active region. The fuel cell stack further comprises gasket means for preventing the oxidant, the fuel gas and the cooling medium from mixing. The gasket means comprises a gasketing material comprising silicone disposed on the substantially flat peripheral sealing region on each face of the bi-polar separator plate, which gasket material contacts the polymer electrolyte membrane, forming a peripheral silicone seal. The gasket material is applied to the substantially flat peripheral sealing regions on each face of the graphite/carbon bi-polar separator plates by a screen-printing process, the details of which are discussed hereinbelow.

The method for integral sealing of a fuel cell stack in accordance with this invention comprises the steps of forming a graphite/carbon composition into a graphite/carbon separator plate having a centrally disposed active region and a substantially flat peripheral sealing region surrounding the centrally disposed active region. A silicone gasket material is applied onto the substantially flat peripheral sealing region completely around the centrally disposed active region, forming a silicone gasket. The graphite/carbon separator plate comprising the silicone gasket is inserted between adjacent fuel cell units of the fuel cell stack, whereby the silicone gasket contacts a peripheral region of a polymer electrolyte membrane of the adjacent fuel cell units, forming a peripheral seal between the graphite/carbon separator plate and the polymer electrolyte membranes.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Bi-polar separator plates for polymer electrolyte membrane fuel cell stacks to which the seal and sealing method of this invention are applied are constructed of graphite or a resin-bonded graphite/carbon composite material. The bi-polar separator plates are frequently treated by coating the surfaces with a wetting agent, such as colloidal silica sols, to render the surfaces thereof hydrophilic. In this way, water generated in the fuel cell is attracted away from the electrode for subsequent disposition. U.S. Pat. No. 5,942,347 describes a gas impervious bi-polar separator plate for a polymer electrolyte membrane fuel cell (referred to therein as a proton exchange membrane fuel cell) comprising at least one electronically conductive material, at least one resin, and at least one hydrophilic agent, wherein the electronically conductive material, the resin, and the hydrophilic agent are substantially uniformly dispersed throughout the separator plate. The preferred composition of this plate comprises a graphitic and resin mixture that, when molded under mild conditions of pressure and temperature, yields a conductive, light weight bi-polar plate suitable for use in low temperature electrochemical systems such as polymer electrolyte membrane fuel cells. More specifically, the separator plate is formed from a composition comprising a mixture of about 50 to 95 weight percent of a graphitic material, e.g., graphite, about 5 to about 30 weight percent of a type of a thermosetting resin, and optionally up to 45 weight percent carbon fibers.

As previously stated, the fuel gas, oxidant and cooling fluid required for operation of a polymer electrolyte membrane fuel cell may be provided through a manifold external to the fuel cell stack, through a manifold internal to the fuel cell stack or through a combination of internal and external manifolds. The integral sealing method of this invention is applicable to externally manifolded fuel cell stacks, externally/internally manifolded fuel cell stacks, and fully internally manifolded fuel cell stacks, and though the method of this invention will be described within the context of a fully internally manifolded fuel cell stack, applications of the method of this invention to less than fully internally manifolded fuel cell stacks are deemed to be within the scope of this invention.

Figure 1:
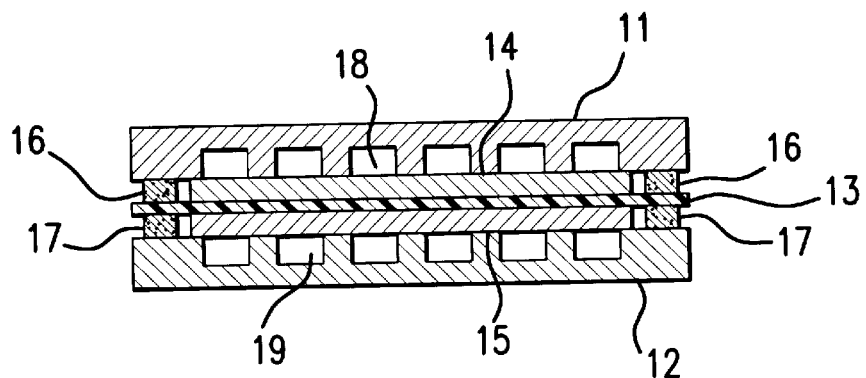
FIG. 1 is a cross-sectional view of a single polymer electrolyte membrane fuel cell disposed between two separator plates having silicone seal areas in accordance with this invention.

FIG. 1 is a cross-sectional lateral view of a polymer electrolyte membrane fuel cell unit or membrane electrode assembly comprising anode electrode 14, cathode electrode 15, and polymer electrolyte membrane 13 disposed therebetween disposed between bi-polar separator plates 11 and 12. Integral sealing in accordance with the method of this invention is provided by silicone seals 16, 17 extending from separator plates 11, 12 to polymer electrolyte membrane 13. As shown in FIG. 1, bi-polar separator plates 11, 12 are coextensive with polymer electrolyte membrane 13 while anode electrode 14 and cathode electrode 15 are sized to correspond to the centrally disposed active region of the bi-polar separator plates 11, 12.

Figure 2:
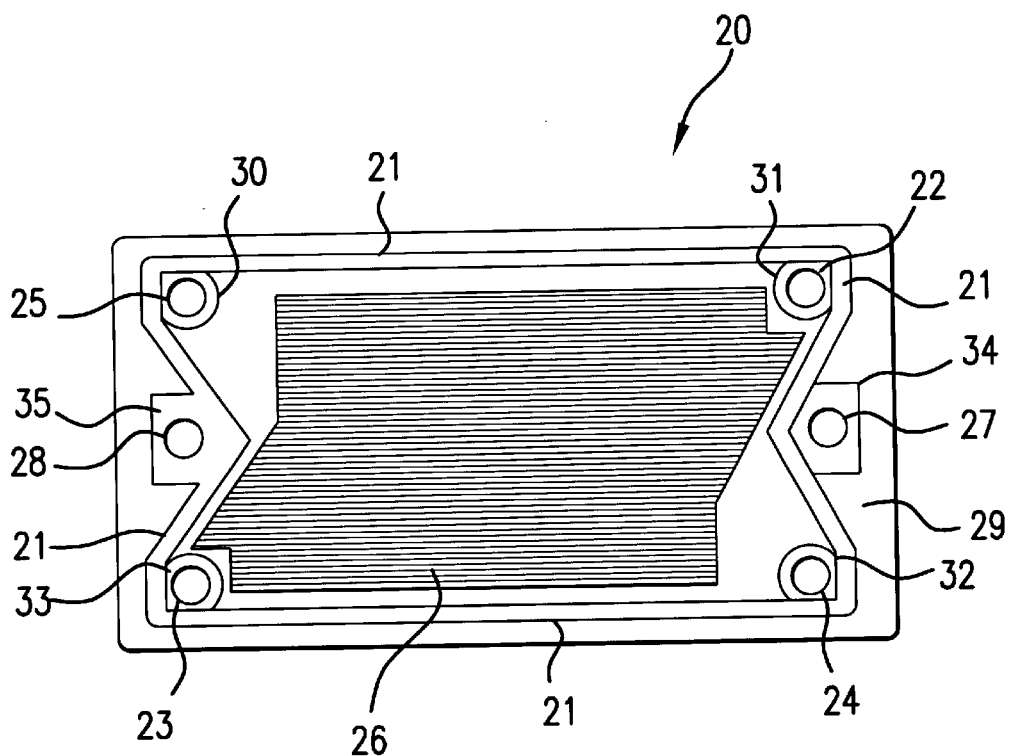
FIG. 2 is a plan view of a polymer electrolyte membrane separator plate having a silicone printed gasket in accordance with one embodiment of this invention.

FIG. 2 is a plan view of one side of a bi-polar separator plate for a fully internally manifolded polymer electrolyte membrane fuel cell stack. Separator plate 20 comprises a substantially flat peripheral region 29 and a grooved centrally disposed active region 26. Bi-polar separator plate 20 further comprises peripheral seal 21 which extends around the entire periphery of separator plate 20, thereby fully surrounding centrally disposed active region 26.

To provide for internal manifolding of the fuel cell stack, separator plate 20 forms a plurality of perforations 22, 23, 24, 25, 27 and 28 which align with corresponding perforations in polymer electrolyte membrane 13 (not shown). In the exemplary embodiments shown in FIG. 2, perforations 22 and 23 provide manifolding for the fuel gas, perforations 24 and 25 provide manifolding for the oxidant and perforations 27 and 28 provide manifolding for the cooling fluid. It will be seen from FIG. 1 that each bi-polar separator plate of a fuel cell stack, with the exception of the outermost plates or end plates have an anode facing side and a cathode facing side. In operation, fuel gas is supplied through fuel gas manifold 22 to the centrally disposed active region of the separator plate on the anode facing side and unreacted fuel gas is exhausted through manifold 23. Similarly, oxidant may be supplied through oxidant manifold 24 to the centrally disposed active region of separator plate 20 on the cathode facing side of separator plate 20 and excess oxidant exhausted through manifold 25. To prevent the fluid flowing through the internal manifolds from leaking or otherwise undesirably mixing, each perforation 22, 23, 24, 25, 27, and 28 is surrounded by a peripheral seal 30, 31, 32, 33, 34, 35. As in the case of the peripheral plate seals, the peripheral perforation seals contact the polymer electrolyte membrane in the area surrounding the perforations therein to provide the desired sealing.

To obtain seals having the desired thickness and degree of softness (Durometer), the silicone sealant is applied to the bi-polar separator plates by a screen-printing process, the first step of which is to fabricate a mesh screen having an image of the sealant area and geometry corresponding to the substantially flat portions of the separator plate to which the silicone sealant is applied. The screen is typically made of a man-made plastic thread, for example, nylon, having thread sizes in the range of about 1/64th to about 1/20th of an inch in diameter with a specific number of threads per inch. Typical screen printing process methods are applied to create the image onto the screen. In particular, developing material is used to create a negative of the actual print. The silicone sealant can then pass through the screen, forming the positive image. The screen and separator plates are set leveled horizontally and centered to each other accordingly. The distance between the screen and the separator plate is preferably in a range of about 10 to about 100 mils. A heat curable two-part silicone fluid available commercially from Rhodia US 1, Troy, N.Y. and Dow Corning Corporation, Midland, Mich. is poured onto the screen. The silicone fluid is forced through the open sections of mesh, that is the image to be printed, onto the surface of the separator plate. Using a screen printing squeegee pressing the screen down onto the surface of the separator plate and pulling the silicone fluid across the screen performs this action. By varying the number of threads per inch, thread size, the ratio of the two-part silicone compound, the distance from separator plate to screen, and viscosity of the silicone fluid, the thickness and Durometer of the silicone deposited onto the separator plate can be varied and controlled.

In addition, it has been found that application of the silicone by screen printing in accordance with the method of this invention and may produce edge regions which are thicker than the center portion of the seals, providing a slightly convex appearance. However, as the seals are narrowed, resulting in closer proximity of the edge regions, this convex appearance disappears. Thus, relative distance between the edges is also a variable for controlling sealant deposition.

After transfer of the silicone sealant onto the separator plate, the silicone surface is blown across with an airstream to remove any air bubbles on the surface of the printed silicone formed during the screening process and allowed to settle up to one hour. The separator plate with the silicone sealant disposed thereon is then heated to a temperature in the range of about 200° F. to about 400° F. for a period of time ranging from about one minute to about 60 minutes. By adjusting the plate temperature and time for curing, the degree of softness (Durometer) can be varied. Durometer, a method of gauging the amount of force required to deform the surface of the silicone material, has shown a range between about zero to 60 (on the Shore A scale) for plates having silicone seals produced in accordance with the method of this invention.

Tests conducted on separator plates with silicone seals produced in accordance with the method of this invention show that the thickness of the silicone seal is substantially uniform to the extent of plus/minus one mil. The overall thickness which can be deposited in a single application is between 1 mil to 20 mils. Multiple applications are also possible to any desired thickness. Tests conducted with separator plates with larger variations in thickness have also been shown to be suitable for sealing.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A fuel cell stack comprising:

a plurality of polymer electrolyte membrane fuel cell units having an anode electrode, a cathode electrode and a polymer electrolyte membrane disposed between said anode electrode and said cathode electrode;

a bi-polar separator plate comprising graphite and having a centrally disposed active region substantially coextensive with said electrodes separating each of said fuel cell units between said anode electrode and said cathode electrode of adjacent said fuel cell units and comprising distribution means for providing an oxidant to said cathode electrode, a fuel gas to said anode electrode and a cooling medium between said anode electrodes and said cathode electrodes and having a substantially flat peripheral sealing region on each face extending around said centrally disposed active region; and gasket means for preventing said oxidant, said fuel gas and said cooling medium from mixing, said gasket means comprising a gasketing material consisting essentially of silicone disposed directly on said substantially flat peripheral sealing region on each said face of said bi-polar separator plate, said gasket material contacting said bi-polar separator plate and said polymer electrolyte membrane, thereby forming a peripheral silicone seal.

2. A fuel cell stack in accordance with claim 1, wherein said gasketing material has a Durometer in a range of about 0 to about 60.

3. A fuel cell stack in accordance with claim 1, wherein said gasketing material has a thickness in a range of about 1 to about 100 mils.

4. A fuel cell stack in accordance with claim 1, wherein said polymer electrolyte membrane and said bi-polar separator plate form a first plurality of aligned perforations through which one of said oxidant, said fuel gas and said cooling medium is distributed to and removed from each of said fuel cell units, said bi-polar separator plate comprises a substantially flat perforation sealing region on each said face surrounding said perforations, and said gasketing material is disposed in said substantially flat perforation sealing region in direct contact with each said face and contacts said polymer electrolyte membrane, forming a peripheral perforation silicone seal.

5. A fuel cell stack in accordance with claim 4, wherein said polymer electrolyte membrane and said bi-polar separator plate form a second plurality of aligned perforations through which another of said oxidant, said fuel gas and said cooling medium is distributed to and removed from each of said fuel cell units, said bi-polar separator plate comprises a second substantially flat perforation sealing region on each said face extending around said second plurality of aligned perforations, and said gasketing material is disposed in said second substantially flat perforation sealing region surrounding said second plurality of aligned perforations on each said face and contacts said polymer electrolyte membrane, forming a second peripheral perforation silicone seal.

6. A fuel cell stack in accordance with claim 5, wherein said polymer electrolyte membrane and said bi-polar separator plate form a third plurality of aligned perforations through which the remaining of said oxidant, said fuel gas and said cooling medium is distributed to and removed from each of said fuel cell units, said bi-polar separator plate comprises a third substantially flat perforation sealing region on each said face surrounding said third plurality of aligned perforations, and said gasketing material is disposed in said third substantially flat perforation sealing region surrounding said third plurality of aligned perforations in direct contact with each said face and contacts said polymer electrolyte membrane forming a third peripheral perforation silicone seal.

7. In a bi-polar separator plate for a polymer electrolyte membrane fuel cell stack having an anode facing face, a cathode facing face, distribution means for providing a fuel gas, oxidant and a cooling medium to each fuel cell unit of said fuel cell stack, and a substantially flat peripheral sealing region on each face, the improvement comprising:

said bi-polar separator plate constructed of a graphite-containing composition and having a gasket consisting essentially of silicone disposed in said substantially flat peripheral sealing regions directly on each said face.

8. In a bi-polar separator plate in accordance with claim 7, wherein said silicone gasket has a Durometer in a range of about 0 to about 60.

9. In a bi-polar separator plate in accordance with claim 7, wherein said silicone gasket has a thickness in a range of about 1 to about 100 mils.

10. In a bi-polar separator plate in accordance with claim 7, wherein said bi-polar separator plate forms a plurality of perforations suitable for distribution of oxidant, fuel gas and cooling medium to each said fuel cell unit of said fuel cell stack, and said bi-polar separator plate comprises a plurality of substantially flat perforation sealing regions surrounding each of said perforations and a perforation silicone gasket disposed in each of said substantially flat perforation sealing regions surrounding each of said perforations.

11. A method for integral sealing of a fuel cell stack comprising the steps of:

forming a composition comprising graphite into a bi-polar separator plate having a centrally disposed active region and a substantially flat peripheral sealing region surrounding said centrally disposed active region;

applying a gasket material consisting essentially of silicone directly onto said substantially flat peripheral sealing region completely around said centrally disposed active region, forming a silicone gasket; and inserting said bi-polar separator plate between adjacent fuel cell units of said fuel cell stack, whereby said silicone gasket contacts a peripheral region of a polymer electrolyte membrane of said adjacent fuel cell units, forming a peripheral seal between said bi-polar separator plate and said polymer electrolyte membrane.

12. A method in accordance with claim 11, wherein said silicone gasket material is applied directly onto said bi-polar separator plate by screen printing.

13. A method in accordance with claim 11, wherein said silicone gasket has a Durometer in a range of about 0 to about 60.

14. A method in accordance with claim 11, wherein said silicone gasket has a thickness in a range of about 1 to about 100 mils.

* * * * *